Sept. 9, 1969  J. F. DE BERRY  3,465,464
FISHING APPARATUS INCLUDING ANIMATED LURE
Filed Aug. 2, 1968
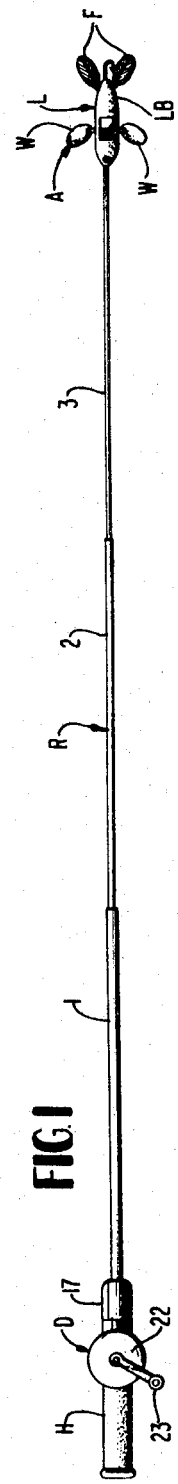
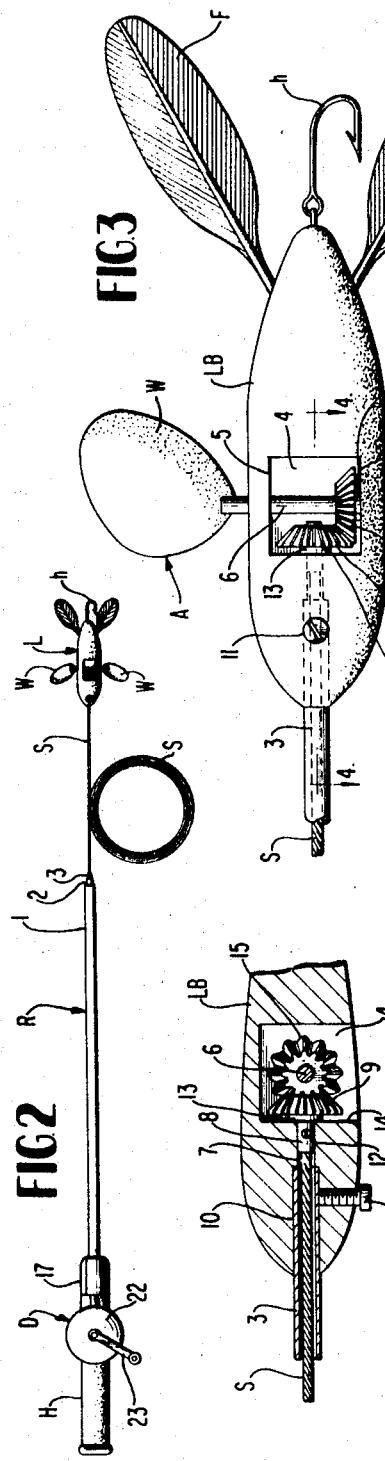
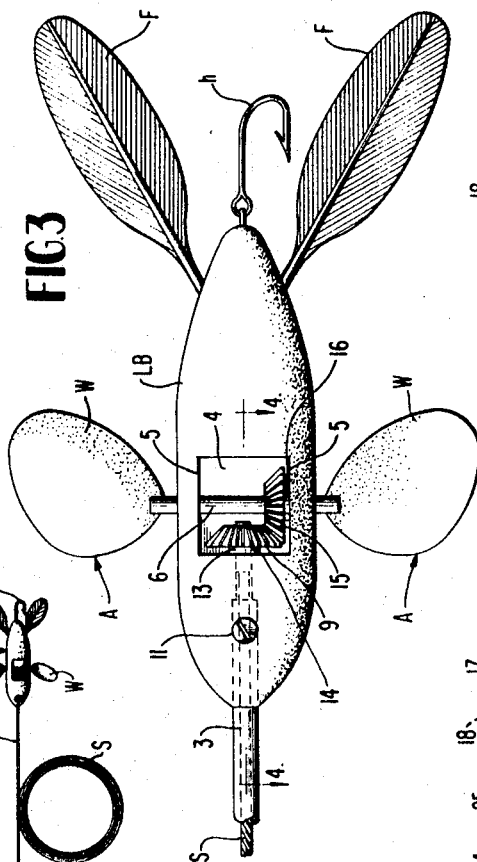
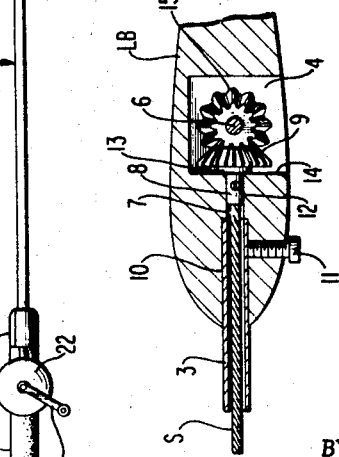
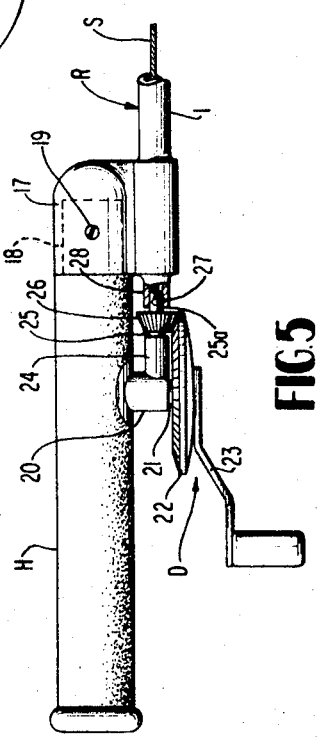
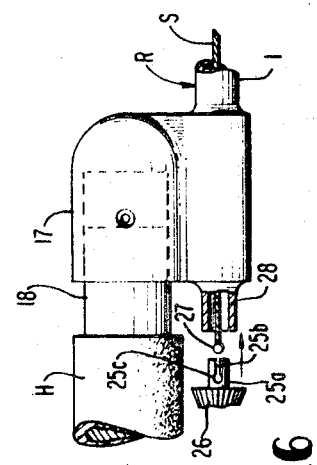
INVENTOR
JAMES F. DeBERRY
BY Baldwin Wight Diller & Brown
ATTORNEYS United States Patent Office 3,465,464
Patented Sept. 9, 1969

3,465,464
FISHING APPARATUS INCLUDING
ANIMATED LURE
James F. De Berry, Cross Plains, Tenn., assignor of one-half interest to O. W. Ramsey, Cross Plains, Tenn.
Filed Aug. 2, 1968, Ser. No. 749,807
Int. Cl. A01k 85/06, 87/00
U.S. Cl. 43—19.2    8 Claims

ABSTRACT OF THE DISCLOSURE

A fishing apparatus comprises a fishing rod, which may be flexible and sectional; a driver on the handle end of the rod; an animated lure including a body fixedly secured to the outer end of the rod and a lure adjunct mounted on and for movement relative to the lure body; and means operatively connecting the driver to the lure adjunct. Angling movement of the lure body in or on the water can take place only by manipulation of the rod.

This invention relates to fishing apparatus including a rod and an animated lure.

There have been prior proposals to provide fishing tackle or apparatus of this broadly indicated character. For example, the patent to Neudeck No. 1,401,096 discloses a fishing rod and animated or propeller driven lure arrangement in which the lure is without fixed connection to the rod and is suspended by a fishing line projecting freely a substantial distance from the rod. Torque transmitted to the lure propeller has the incidental effect of causing the lure body to turn and move in an unpredictable path beyond control of the fisherman. This may result in the lure's becoming fouled by an obstruction, such as a sunken log, branch or the like.

Other prior art animated lure arrangements are disclosed in the patents to Grossman No. 1,906,791, Timm No. 2,244,032, and Ashley No. 2,796,605.

An object of the present invention is to provide an improved fishing apparatus comprising a rod, a driver on the rod, and an animated lure fixedly secured to the rod and being operatively connected to the driver, the arrangement being such that animation of the lure by operation of the driver will not cause the lure, in its entirety, to partake of any movements other than those intended by the fisherman.

Other objects of the invention of a more particular nature will become apparent from a reading of the following description, the appended claims, and the accompanying drawings, in which:

FIGURE 1 is an elevation of the assembled fishing apparatus, showing the rod extended to its maximum length and a lure secured to the rod in readiness for use;

FIGURE 2 is an elevation of the apparatus, showing the rod sections telescoped or retracted and the lure disconnected from the rod;

FIGURE 3 is an enlarged scale elevation of the complete lure, parts only of the rod and a flexible shaft being shown;

FIGURE 4 is a fragmentary sectional view on the line 4—4 of FIGURE 3;

FIGURE 5 is an enlarged scale fragmentary top plan view showing part of the rod, the rod handle and a driving mechanism in assembled relation; and FIGURE 6 is a fragmentary top plan view showing certain of the parts illustrated in FIGURE 5 partly disassembled and in different positions.

In its general nature, fishing apparatus in accordance with the invention as illustrated by a representative embodiment includes a rod generally designated R, a rod handle H, and a lure generally designated L secured to the rod and being equipped with an adjunct A movable with respect to the lure body LB in response to operation of a driver D on the handle H connected to the adjunct A by a shaft S. In use, the angler holds the rod out with the lure L submerged or on top of the water, and operates the driver D to effect movement of the adjunct A relative to the lure body LB. Because of the fixed connection of the lure L to the rod R, the lure is held against rotation relative to the rod, and the angler may move the lure through the water under very close control so as to cause the lure to run straight, dive, skip, or carry out such other movements as may be thought to attract fish while at the same time avoiding sunken logs or branches and water grass or other obstructions. Fixed connection of the lure to the rod prevents the lure from making movements which the fisherman does not wish it to perform.

The lure body LB may be formed of any suitable material such as wood, plastic, or light metal, and may be shaped to simulate a bug or the like, being equipped with tail feathers F, F. In the form shown, the adjunct A comprises two parts simulating bug or insert wings W, W mounted exteriorly of the body LB for movements relative to the latter. The usual hook h is provided.

The rod R may be of any desired length suited to the fishing conditions, for example ten or twenty feet, or even more, and preferably although not necessarily is of a known or conventional telescopic construction including, as shown, relatively extensible or retractable telescopic sections 1, 2 and 3. Internal stops of any known kind may be provided for limiting the extending movement of the sections to prevent separation. The rod preferably is flexible and may be made, for example, of fiber glass or steel.

The lure body LB is generally of a torpedo or fishing "plug" shape formed with a generally centrally located cutout section 4 defined in part by two spaced side walls 5, 5 providing bearings for a transverse shaft 6 which projects outwardly beyond the walls 5, 5 to receive the adjunct wings W, W. At its forward end, the body LB is formed with a longitudinal or axial recess 7 opening into the cutout section 4. The recess 7 provides a bearing for the hub 8 of a bevel gear 9 mounted in the section 4. When the parts are assembled, the outer or lure end of the rod R is received in an enlarged recess 10 aligned with the bearing recess 7, and is secured in place by a set screw 11. In the assembled construction, the outer end of the shaft S is received in the bevel gear hub 8 and is held in place by a set screw 12 the head of which is below the surface of the hub 8 so as not to interfere with rotation of the hub in the bearing recess 7. The bevel gear 9 is formed with a thrust bearing shoulder 13 which has bearing engagement with an end wall 14 of the cutout section 4, as shown in FIGURES 3 and 4.

The bevel gear 9 meshes with a cooperating bevel gear 15 fixed to the transverse shaft 6, the gear 15 being provided with a shoulder 16 bearing against the adjacent bearing wall 5, thus holding the gears 9 and 15 in properly meshing relation. It will be apparent that when the shaft S is rotated drive will be transmitted through the gears 9 and 15 to the transverse shaft 6 to rotate the adjunct wings W, W. In short, the lure adjunct A is movable in response to operation of the driver D.

The flexible shaft S extends through the hollow rod R from the lure L to the driver D, operation of which rotates the shaft S and hence the wings W, W.

Referring now to the connection of the shaft S to the driver D, the handle end of the rod R is provided with a laterally offset socket 17 adapted to receive the reduced end part 18 of the handle H as shown in FIGURES 5 and 6. When the parts are completely assembled as shown in FIGURE 5, the handle end part 18 is held in the socket 17 by a set screw 19.

The handle H is provided with a laterally offset bearing 20 which journals a shaft 21 on which is mounted a bevel gear 22 adapted to be rotated by a crank 23. Projecting from the bearing 20 and at right angles thereto is a further bearing 24 which journals a shaft 25 carrying a bevel pinion 26 meshing with the bevel gear 22. The end 25a of the shaft 25 is formed with a longitudinal slot 25b and with a transverse opening 25c at the root of the slot 25b. A cross pin 27 extends through the transverse opening 25c and is connected to the end of the flexible shaft S. An extension 28 on the rod R surrounds the end 25a of the pinion shaft 25 to prevent displacement of the pin 27 from the transverse opening 25c. It is apparent that rotation of the crank 23 and the bevel gear 22 will rotate the bevel pinion 26 and hence the shaft S so as to drive the bevel gear pair 9, 15 of the lure and thus rotate the wings W, W.

The apparatus may be assembled conveniently by firstly securing the lure bevel gear 9 to one end of the shaft S, and then threading the shaft through the longitudinal recesses 7 and 10 in the lure body LB and through the telescoped or retracted rod sections 1, 2 and 3 until the bevel gear shoulder 13 abuts the wall 14 of the body cutout section 4. The bevel gear 15 is then positioned in the cutout section 4 in mesh with the bevel gear 9, and the transverse gear shaft 6 is extended through the walls 5, 5 and the bevel gear 15, after which the bevel gear is secured to the shaft 6 in any suitable way as by a set screw, not shown. The wings W, W are then attached to the projecting ends of the shaft 6.

With the handle H and the rod socket 17 in relatively separated positions as shown in FIGURE 6, the free end of the shaft S is extended through the rod extension 28 and is fitted with the cross pin 27. The cross pin is then inserted laterally into the transverse opening 25c in the shaft extension 25a of the bevel pinion 26, the end part of the shaft S immediately adjacent the cross pin 27 then being received in the slot 25b. After connecting the shaft end to the bevel pinion 26, the handle H and rod socket 17 are brought together to the relative positions shown in FIGURE 5 and locked in these positions by tightening the set screw 19. The rod extension 28 will then prevent displacement of the pin 27 and the shaft end from the opening 25c and the slot 25b.

The rod sections 1, 2 and 3 are then extended until the outer end of the section 3 is positioned in the lure body recess 10, and the set screw 11 is then tightened. This completes the assembly. The apparatus is then ready for use, with the lure body LB being fixed to the rod R so that the lure cannot wander with the current or wind, or twist or turn bodily due to torque transmitted to the adjunct A. Instead, all movements of the lure are under the complete control of the fisherman even when the driver D is operated to actuate the wings W, W.

In order to reduce the over-all length of the apparatus for handling or transportation when not being used for fishing, the releasable set screw 11 may be loosened to permit the rod section 3 to be moved out of the lure body recess 10 so that the rod sections may be telescoped or retracted without its being necessary to disconnect the shaft S from the lure bevel gear 9 or from the driver bevel pinion 26. Such retraction or telescoping of the rod sections will leave a substantial portion of the shaft S extended free of the rod. Since the shaft S is flexible, it may be coiled as shown in FIGURE 2, thus rendering the apparatus more convenient for carrying.

The apparatus shown and described embodies the invention in a preferred form, but the disclosure is intended to be illustrative rather than definitive.

I claim:

1. A fishing apparatus comprising a fishing rod having a handle end and a lure end; a lure body secured to said rod lure end and held against rotation relative thereto; a lure adjunct mounted on said lure body exteriorly thereof for movement relative thereto; a driver mounted on said rod handle end; and means operatively connecting said driver to said lure adjunct for effecting movement of said adjunct relative to said lure body in response to operation of said driver while said lure body is held against rotation relative to said rod lure end.

2. Fishing apparatus according to claim 1 in which said lure adjunct is mounted for rotation on said lure body, said drive is mounted for rotation on said rod handle end, and said connecting means comprises a shaft extending longitudinally of said rod.

3. Fishing apparatus according to claim 2 including a gear shaft journalled in said lure body and projecting outwardly therefrom, said adjunct being mounted on said gear shaft; and gearing connecting said gear shaft to said shaft extending longitudinally of said rod.

4. Fishing apparatus according to claim 3 in which said gear shaft is transverse to said rod and said gearing comprises intermeshing bevel gears respectively connected to said gear shaft and said shaft extending longitudinally of said rod.

5. Fishing apparatus according to claim 2 in which said rod and said shaft are flexible.

6. Fishing apparatus according to claim 2 in which said rod is hollow and said shaft extends therethrough.

7. Fishing apparatus according to claim 5 in which said rod comprises a plurality of relatively extensible and retractable telescopic sections.

8. Fishing apparatus according to claim 7 including releasable securing means for mounting said lure body on said rod lure end and holding said lure body against movement relative to said rod when said apparatus is in use, releasing of said securing means enabling said lure body to be disconnected from said rod lure end when said apparatus is not to be used.

References Cited
UNITED STATES PATENTS

| | | | |
|---|---|---|---|
| 1,122,466 | 12/1914 | Beyer | 43—19.2 |
| 1,401,096 | 12/1921 | Neudeck | 43—19.2 |
| 1,465,707 | 8/1923 | Batholomew | 43—19.2 |
| 1,487,556 | 3/1924 | Goble | 43—26.2 |

WARNER H. CAMP, Primary Examiner

U.S. Cl. X.R.

43—26.2